(12) United States Patent
Schrinner et al.

(10) Patent No.: US 8,174,396 B1
(45) Date of Patent: May 8, 2012

(54) COMMUNICATION SYSTEM FROM AIRPORT GATE TO COCKPIT

(75) Inventors: Scott E. Schrinner, Jamestown, OH (US); David K. McIntire, Beavercreek, OH (US); James Dillon, Jamestown, OH (US)

(73) Assignee: Twist, Inc., Jamestown, OH (US)

( * ) Notice: Subject to any disclaimer, the term of this patent is extended or adjusted under 35 U.S.C. 154(b) by 850 days.

(21) Appl. No.: 12/416,731

(22) Filed: Apr. 1, 2009

(51) Int. Cl.
*G08B 17/00* (2006.01)

(52) U.S. Cl. .................. 340/584; 285/148.15; 285/320; 285/311; 141/383; 292/11

(58) Field of Classification Search .................. 340/584; 285/148.15, 320, 311, 312, 358, 87, 325, 285/409; 141/383, 384, 382; 292/11, 46, 292/97, 98, 113, 132, 232
See application file for complete search history.

(56) References Cited

U.S. PATENT DOCUMENTS

| | | | | |
|---|---|---|---|---|
| 5,319,698 A | * | 6/1994 | Glidewell et al. | ............... 379/39 |
| 5,715,701 A | | 2/1998 | Kreymer | |
| 2006/0181425 A1 | * | 8/2006 | Crane et al. | ................... 340/612 |

* cited by examiner

*Primary Examiner* — Travis Hunnings
(74) *Attorney, Agent, or Firm* — Wood, Herron & Evans, LLP

(57) ABSTRACT

An apparatus for visually communicating to a pilot in the cockpit of a parked aircraft the status of a preconditioned air (PCA) unit associated with the gate has an electrically controlled PCA indicator box positioned so that it is visible to the pilot in the cockpit. The PCA indicator box has a first appearance when the preconditioned air unit is not operating and a second appearance when the preconditioned air unit is operating. A method of assisting aircraft operators to reduce fuel costs and emissions of an aircraft parked at a gate includes mounting to the gate an electrical PCA indicator and electrically coupling it to a preconditioned air unit at the gate.

21 Claims, 4 Drawing Sheets

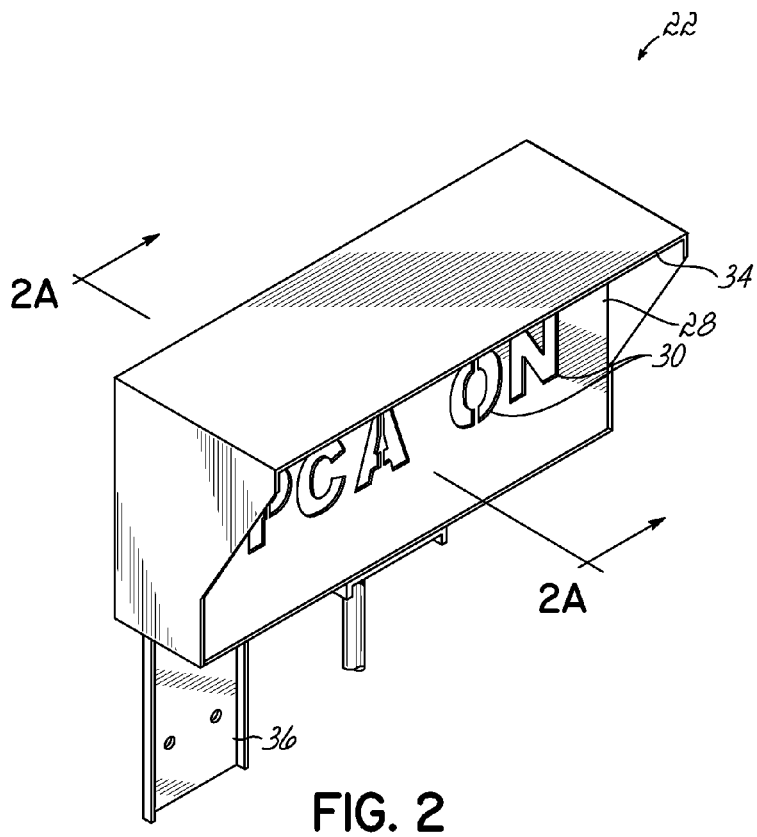
FIG. 2
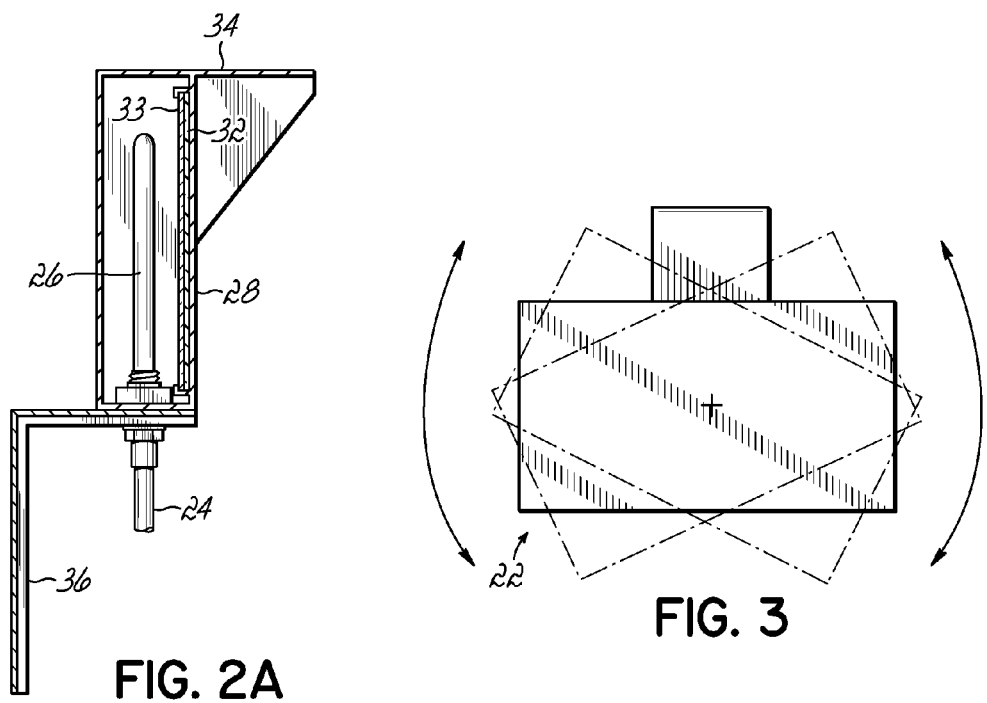
FIG. 2A
FIG. 3

COMMUNICATION SYSTEM FROM AIRPORT GATE TO COCKPIT

FIELD OF THE INVENTION

The present invention generally relates to ground-based conditioned air systems for aircraft.

BACKGROUND

It is generally known to supply commercial aircraft with conditioned air for heating and cooling when the aircraft is stationary at a gate. In this application, the term gate is meant to refer to any place that an aircraft receives or discharges passengers or cargo. This may be by way of a telescoping corridor, stairs, or any other facility. Typically, conditioned air is supplied to the aircraft from a pre-conditioned air (PCA) unit that has a ducting system associated with the gate that is a part of the airport terminal. The air is delivered from the gate to the aircraft with a flexible and usually insulated air hose. When not in use, the hose is stored under the terminal. When hooked up to an aircraft the blowers of the PCA are energized, and air flows to the aircraft. This means it is unnecessary for the airplane's fuel powered auxiliary power unit (APU) to produce conditioned air for the stationary aircraft. The pilot can turn off the APU, thus preventing the increased cost and pollution caused by burning the fuel.

SUMMARY OF THE INVENTION

In practice, airlines are finding that the pilots run the APU unnecessarily. They either do not turn it off, or there is a delay in turning it off. Part of the reason for this is that the pilot has no convenient way to know that their aircraft has been hooked up to the PCA supply. If they have to leave the cockpit to find and ask a member of the ground crew, or to examine the supply of air themselves, they are no longer at the cockpit controls for the APU.

Thus, there is a need for a device visible to the pilot in the cockpit of an aircraft parked at an airport gate regarding the status of a preconditioned air unit associated with the gate. The device includes an electrically controlled PCA indicator box positioned at the gate so that the message of the PCA indicator box is visible to the pilot in the cockpit. The PCA indicator box has a first appearance when the preconditioned air unit is not operating and a second appearance when the preconditioned air unit is operating.

In another embodiment, a method of assisting aircraft operators to reduce fuel costs and emissions of an aircraft parked at a gate includes mounting to the gate, in a position that will be in view from a cockpit of the aircraft, an electrical PCA indicator having a first appearance when the electrical PCA indicator is operating, and a second appearance when the electrical PCA indicator is not operating. The electrical PCA indicator is electrically coupled to a preconditioned air unit at the gate so that when the preconditioned air unit is operating the first appearance is visible, and when it is not operating the second appearance is visible.

BRIEF DESCRIPTION OF THE DRAWINGS

The accompanying drawings, which are incorporated in and constitute a part of this specification, illustrate embodiments of the invention and, together with the general description of the invention given above, and the detailed description given below, serve to explain the principles of the invention.

FIG. 2 is a detailed view of the PCA indicator box of FIG. 1.

FIG. 2A is a cross-sectional view as indicated in FIG. 2.

FIG. 3 is a top-down view of the PCA indicator box in FIG. 2, with phantom lines showing the PCA indicator box oriented in different directions.

DETAILED DESCRIPTION

Figure 1:
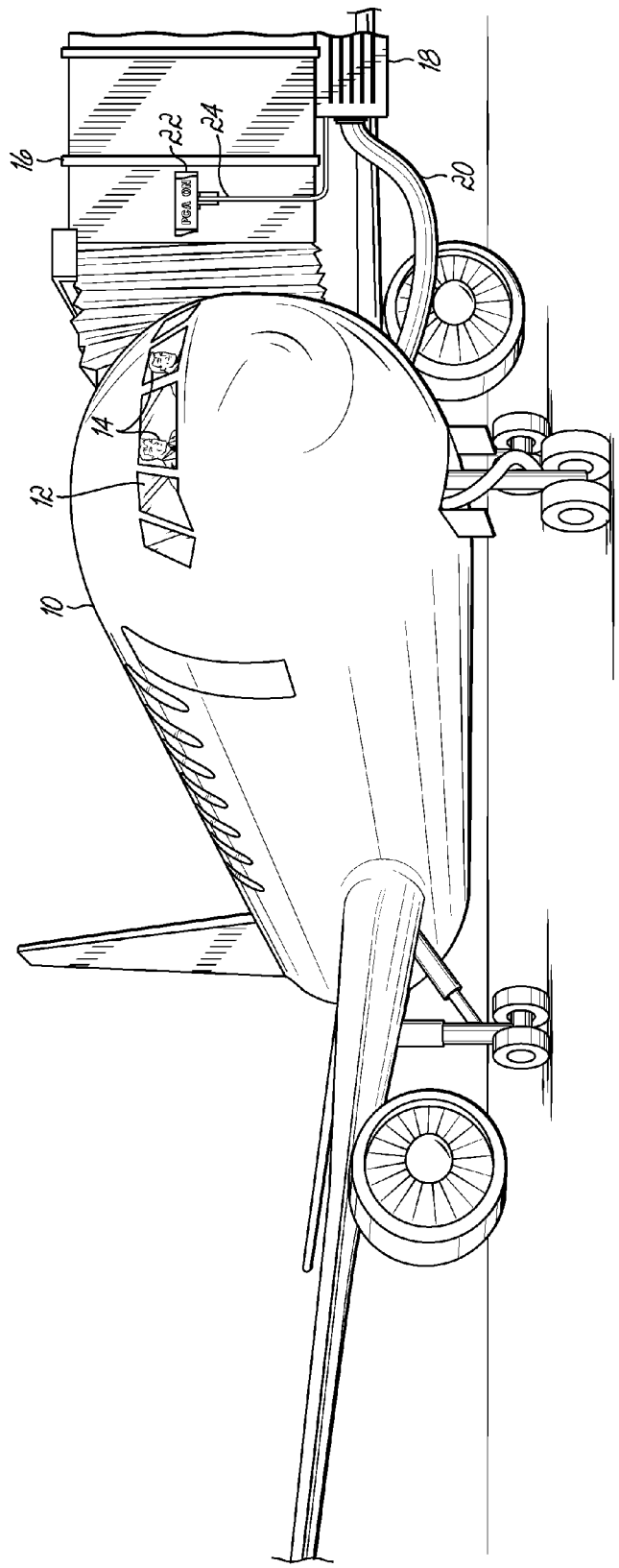
FIG. 1 is a perspective view illustrating an embodiment of the present invention.

FIG. 1 illustrates an aircraft 10 having a cockpit 12 with two pilots 14 at a gate 16 at an airport. On the gate is a preconditioned air (PCA) unit 18 having a hose 20 delivering preconditioned air to the aircraft. A PCA indicator box 22 is attached to the gate in view of the pilots. An electrical supply conduit 24 runs from the PCA unit to the PCA indicator box. The PCA indicator box 22 contains an illuminator 26 that is operates at the same time that the PCA unit operates. Because an electrician of ordinary skill in the art could wire the PCA indicator box 22 to a switch or the circuitry of the PCA unit 18, the wiring will not be further described here. What is important is that the PCA indicator box be illuminated only when the PCA unit is operating. In one embodiment, the PCA indicator box may be controllable by human intervention such as by flipping a switch solely for the PCA indicator box. However, such an embodiment would be subject to human error. On the other hand, a direct arrangement wherein the PCA indicator box receives its power when the operational components of the PCA unit get their power, would be less prone to human error.

Referring to FIGS. 2, 2A, and 3, the PCA indicator box has a front face 28 with cut-out letters 30. Behind the front face 28 is an impact resistant transparent or translucent sheet 32 such as an acrylic, like PLEXIGLAS, a prismatic lens sheet 33, and the illuminator 26. The transparent or translucent sheet may be tinted for increased contrast of the letters 30 compared to the color of the face 28. The prismatic lens sheet 33 is one way to enhance the daylight visibility of the sign so that it may be used in all light conditions, and one of ordinary skill in the art will recognize other ways to do the same. The PCA indicator box is fabricated from a sturdy powder coated painted metal made for outdoor use, but it may be made of any other suitable materials. The PCA indicator box may also have more than one (not shown) face 28, so that a single illuminator 26 could illuminate the same or different messages on the multiple faces. A hood 34 extends over the face to help prevent sunlight from washing-out the illumination passing through the cut-out letters. The PCA indicator box is attached to a universal mounting bracket 36 that attaches to the gate and can swivel, as shown in FIG. 3, so the face of the PCA indicator box may be oriented. The mounting bracket allows attachment and adjustment of the PCA indicator box at a wide variety of gates and structures to make the PCA indicator box visible to the pilots in the cockpit. A variety of universal mounting brackets 36 may be constructed by one of ordinary skill in the art to provide movement in the horizontal as well as vertical planes. Mounting brackets will not be further detailed here. During installation of the PCA indicator box, the electrician may run rigid conduit 24 to supply electrical power. To accommodate the need to occasionally adjust the PCA indicator box, FIGS. 1 and 2 illustrate the conduit 24 entering at the rotational axis so that the PCA indicator box may be more easily oriented.

Alternatively, where electrical code and airport policies allow, a flexible electrical conduit 38 (FIG. 4) is used. This flexible electrical conduit 38 may be electrician supplied, or it may be supplied as part of the PCA indicator box.

When operating in an airport environment, where high velocity winds produced by jet engines may turn loose or poorly fastened items into projectiles, fabrication details of the PCA indicator box and the wiring must be within parameters for such locations. These parameters are usually set forth in codes and standards. A sturdy metal box enclosing a light source behind translucent sheet is one form of such construction, but other forms are within the scope of the current invention.

Figure 4:
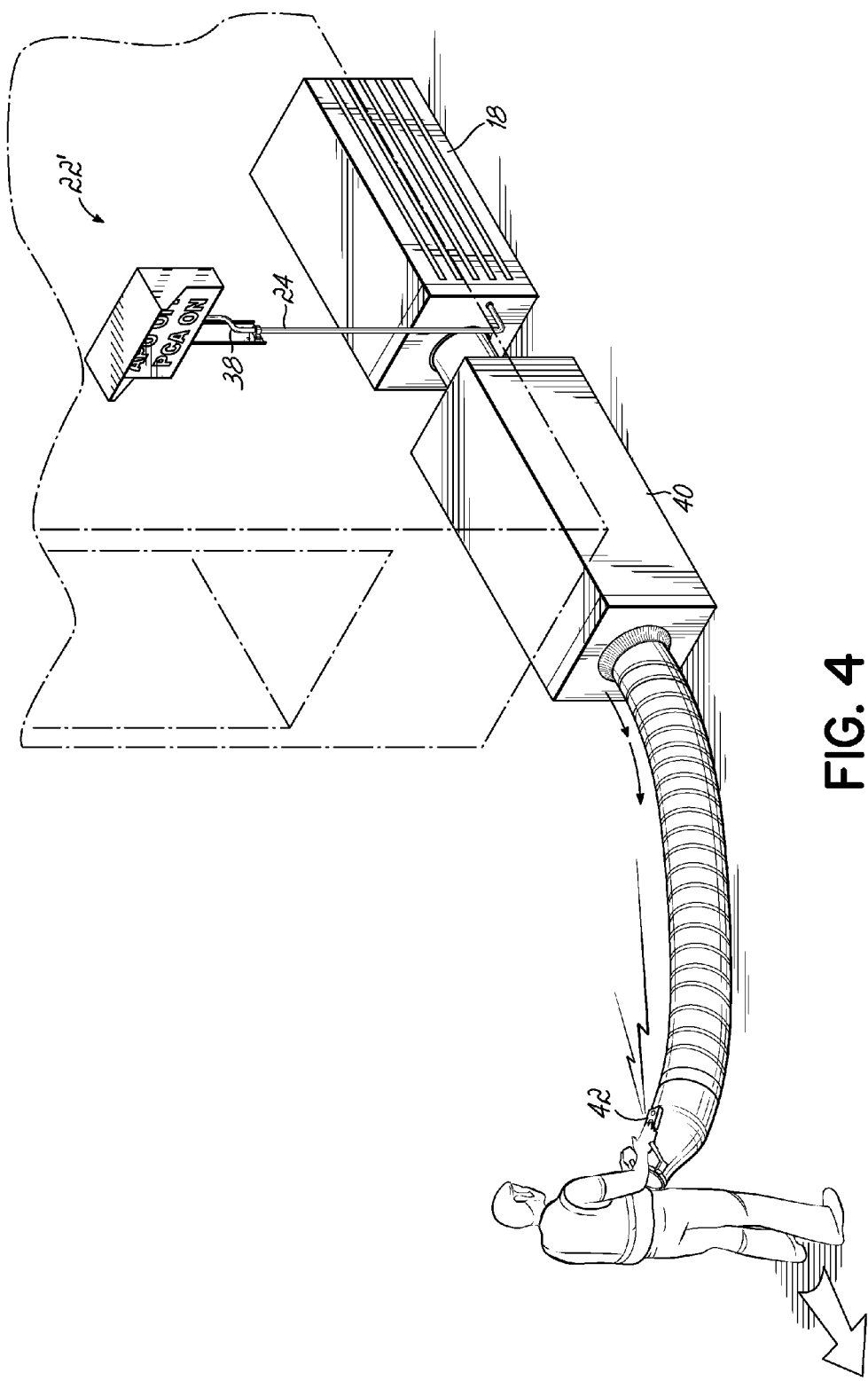
FIG. 4 is a perspective view illustrating a hose retractor in use along with the current invention.
Figure 5:
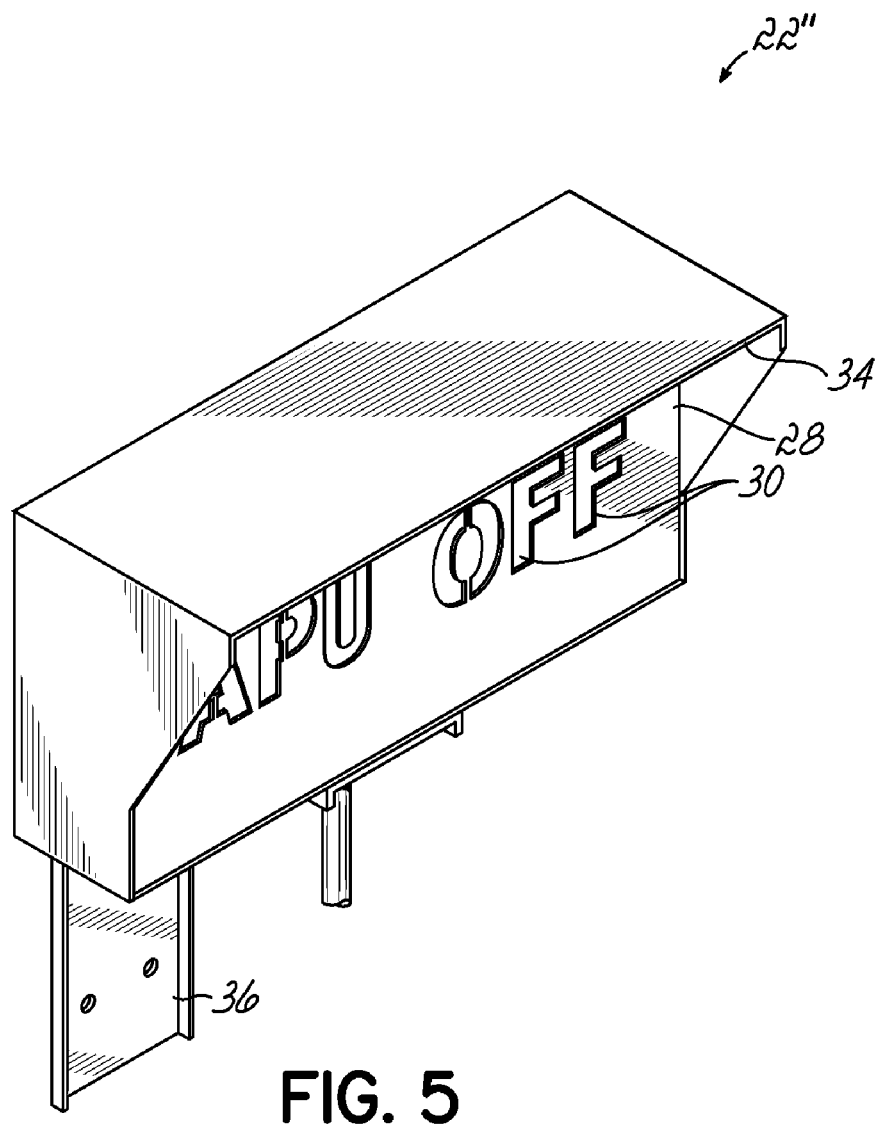
FIG. 5 is a detailed view of a PCA indicator box 22" with a different message than that of FIG. 2.

The message of the PCA indicator box 22 reads, in the first line, "APU OFF" and in the second line "PCA ON". These are words chosen to tell the pilot that the Preconditioned Air Unit is on, and that if their training and policies so instruct, they should turn their APU off. In FIG. 4, an alternative message is displayed on PCA indicator box 22', that reads, in the first line, "APU OFF" and in the second line "PCA ON". The PCA indicator box 22 may use all of these words, some of these words, or any other words that convey a message relative to use of the APU to the pilots. For example, the indicator box may indicate that the PCA is turned off and the APU must be turned on, in addition to or instead of the illustrated message. FIG. 5 shows yet another PCA indicator box 22", in which the message is only "APU OFF", which would be a possible instruction for the pilot to follow, to turn their APU off. In any of the embodiments of the PCA indicator box, one of ordinary skill in the art will recognize that the illuminator may be made to work in a flashing mode as well as a steadily illuminated mode.

Further, the PCA indicator box need not be a sign working by internal illumination. For example, an electromechanical device, illuminated at night by external sources, may also convey this information to the pilot.

Referring to FIG. 4, the PCA indicator box and PCA unit are part of a system using a hose retractor 40. When the operator turns on the PCA unit by using the remote control 42 shown, or by any other switch, the PCA indicator box will illuminate and be seen by the pilot so he or she can turn off the APU.

Although the invention as described applies power to the PCA indicator box coincident with the beginning of actual operation of the PCA unit, in some embodiments additional steps may be taken to guard against human error. For example, should a member of the grounds crew turn on the PCA unit without physically attaching the hose to the aircraft, sensors coupled to the PCA indicator box might detect this condition and prevent the box from illuminating, preventing discomfort in the aircraft while it is stationary.

The invention has been described herein with reference to specific embodiments, and those embodiments have been explained in substantial detail. However, the principles of the present invention are not limited to such details which have been provided for exemplary purposes.

What is claimed is:

1. An apparatus for visually communicating to a pilot in the cockpit of an aircraft parked at an airport gate regarding a status of a preconditioned air unit associated with the gate comprising:
    an electrically controlled PCA indicator box positioned at the gate so that the message of the PCA indicator box is visible to the pilot in the cockpit;
    the PCA indicator box having a first appearance when the preconditioned air unit is not operating; and
    the PCA indicator box having a second appearance when the preconditioned air unit is operating.

2. The apparatus of claim 1 wherein the second PCA indicator box appearance communicates to the pilot that the preconditioned air unit is operating and that the pilot is to turn the aircraft's auxiliary power unit off.

3. The apparatus of claim 1 wherein the PCA indicator box is not illuminated when the preconditioned air unit is not operating, and is illuminated when the preconditioned air unit is operating.

4. The apparatus of claim 3 wherein the illuminated condition is a flashing illuminated condition.

5. The apparatus of claim 1 further comprising an illuminator for the PCA indicator box, wherein the illuminator's electrical power is controlled by the electrical power flow to the preconditioned air unit.

6. The apparatus of claim 1 further comprising a universal mount comprising a first portion for mounting to the gate adjustably coupled to a second portion mounted to the PCA indicator box.

7. The apparatus of claim 1, the electrically controlled PCA indicator box further comprising:
    a face substantially facing the pilot having translucent indicia; and
    an electric illuminator positioned behind the face to project light through the translucent indicia towards the pilot.

8. The apparatus of claim 7, the electrically controlled PCA indicator box further comprising:
    a sun shade to reduce sunlight on the electric illuminator.

9. The apparatus of claim 7 wherein the indicia spell the phrases "PCA On" and "APU OFF".

10. The apparatus of claim 7 wherein the indicia spell the phrase "PCA On".

11. The apparatus of claim 7 wherein the indicia spell the phrase "APU OFF".

12. The apparatus of claim 7 wherein the translucent indicia comprise:
    a metal plate with the indicia cut-out; and
    a translucent sheet between the metal plate and the illuminator.

13. The apparatus of claim 7 wherein the translucent indicia comprise:
    a metal plate with the indicia cut-out;
    a transparent sheet between the metal plate and the illuminator; and
    at least one prismatic lens between the transparent sheet and the illuminator.

14. A method of assisting aircraft operators to reduce fuel costs and emissions of an aircraft parked at a gate comprising:
    mounting to the gate in a position that will be in view from a cockpit of the aircraft an electrical PCA indicator having a first appearance when the electrical PCA indicator is not operating, and a second appearance when the electrical PCA indicator is operating;
    electrically coupling the electrical PCA indicator to a preconditioned air unit at the gate so that when the preconditioned air unit is not operating the first appearance is visible, and when it is operating the second appearance is visible.

15. The method of claim 14 further comprising:
    not illuminating the PCA indicator box when the preconditioned air unit is not operating; and,
    illuminating the PCA indicator box when the preconditioned air unit is operating.

16. The method of claim 14 further comprising:
controlling electrical power to an illuminator for the PCA indicator box by using the electrical power flow to the preconditioned air unit.

17. The method of claim 14 wherein the second appearance indicates with words or symbols that the preconditioned air unit is on.

18. The method of claim 17, the step of indicating comprising:
spelling the phrase "PCA On".

19. The method of claim 17, the step of indicating comprising:
spelling the phrase "APU OFF".

20. The method of claim 17 wherein the second appearance further indicates with words or symbols that the pilot should turn off the aircraft APU.

21. The method of claim 20 further comprising:
spelling the phrases "PCA On" and "APU OFF" as a part of the second appearance.

* * * * *